United States Patent [19]

Horowitz

[11] 4,002,374
[45] Jan. 11, 1977

[54] TRAILER AIR DISTRIBUTION VALVE

[75] Inventor: Charles Horowitz, Niles, Ill.

[73] Assignee: Sloan Valve Company, Franklin Park, Ill.

[22] Filed: May 7, 1975

[21] Appl. No.: 575,468

[52] U.S. Cl. ............................... 303/29; 137/102; 303/30; 303/71

[51] Int. Cl.² .................. B60T 15/48; B60T 17/04

[58] Field of Search .............. 303/9, 13, 28, 29, 30, 303/40, 48, 59, 60, 68, 7, 71; 137/102; 188/170

[56] References Cited

UNITED STATES PATENTS

| | | | |
|---|---|---|---|
| 3,097,021 | 7/1963 | Dobrikin | 303/29 |
| 3,304,131 | 2/1967 | Bueler | 303/13 X |
| 3,411,836 | 11/1968 | Dobrikin et al. | 303/29 X |
| 3,456,991 | 7/1969 | Valentine et al. | 303/29 |
| 3,549,208 | 12/1970 | Cruse | 303/9 X |
| 3,820,854 | 6/1974 | Stearns | 303/9 |
| 3,862,782 | 1/1975 | Horowitz et al. | 303/30 X |
| 3,869,177 | 3/1975 | Urban et al. | 303/9 X |

*Primary Examiner*—Trygve M. Blix
*Assistant Examiner*—Douglas C. Butler
*Attorney, Agent, or Firm*—Kinzer, Plyer, Dorn & McEachran

[57] ABSTRACT

A trailer air distribution valve has a housing, a chamber in the housing and an air inlet port, an exhaust port, at least one service tank port, an emergency tank port and at least one brake chamber port, all in communication with the chamber. A shuttle is movable within the chamber to control communication between the ports and includes a pair of spring biased valves functioning as check valves to control communication between the inlet port and service tank port and the emergency tank port.

15 Claims, 4 Drawing Figures

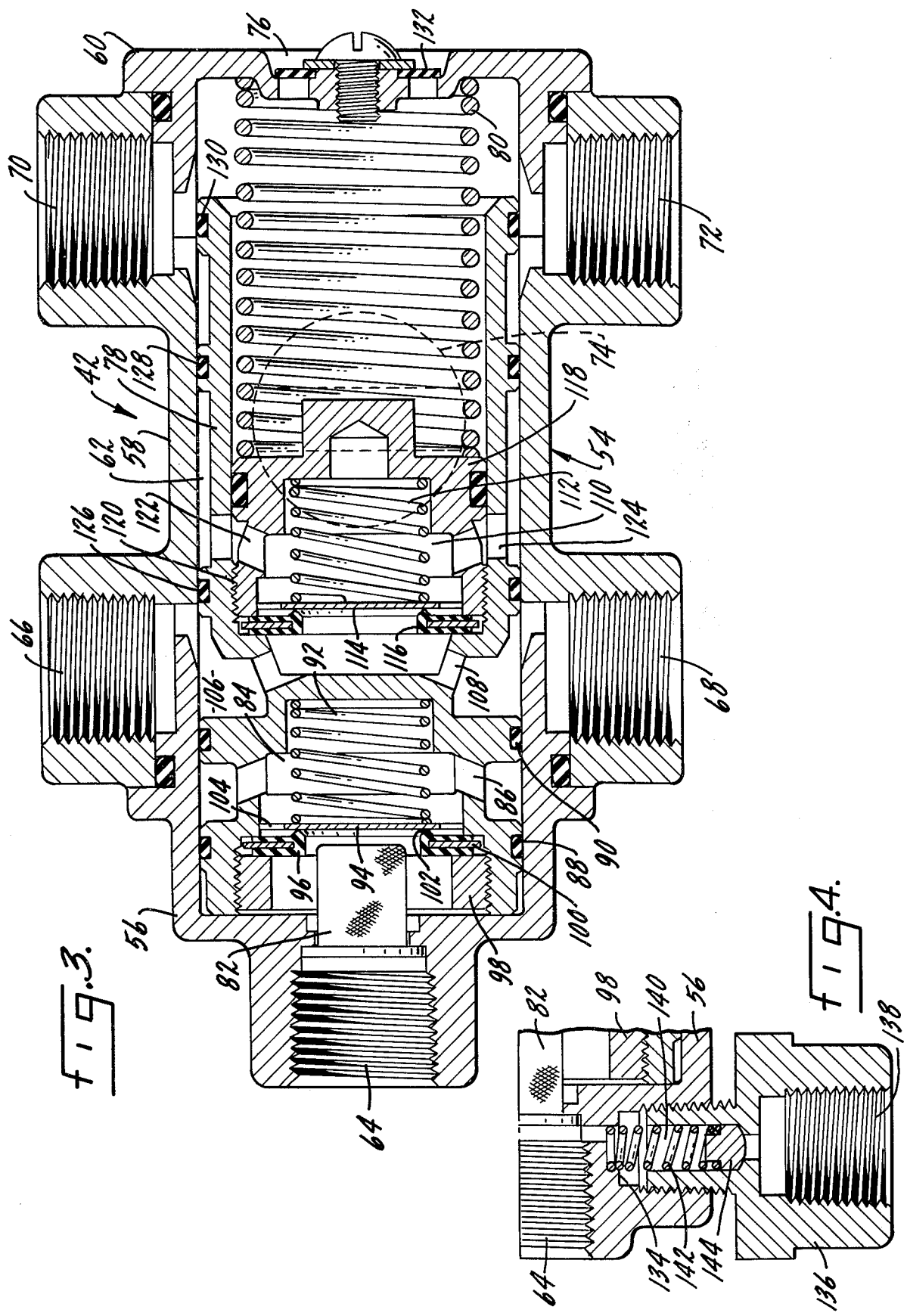

TRAILER AIR DISTRIBUTION VALVE

SUMMARY OF THE INVENTION

The present invention relates to an air distribution valve for use on a trailer which provides connections between an air inlet, brake chamber ports, an exhaust port and service tank and emergency tank ports.

A primary purpose of the present invention is an air distribution valve of the type described including a movable shuttle having a pair of check valves therein, with the shuttle and check valves controlling flow between all of said ports.

Another purpose is an air distribution valve of the type described which is simple in construction and reliably operable.

Another purpose is an air distribution valve for use in a trailer which has a single slidable member, a shuttle, with the shuttle and its associated check valves controlling communication between all ports opening into the valve central chamber.

Another purpose is an air distribution valve of the type described which eliminates a conventional ratio relay valve and a separate pressure protection valve.

Other purposes will appear in the ensuing specification, drawings and claims.

BRIEF DESCRIPTION OF THE DRAWINGS

The invention is illustrated diagrammatically in the following drawings wherein:

FIG. 3 is a section along plane 3—3 of FIG. 2, and FIG. 4 is a section along plane 4—4 of FIG. 2.

DESCRIPTION OF THE PREFERRED EMBODIMENT

Figure 1:
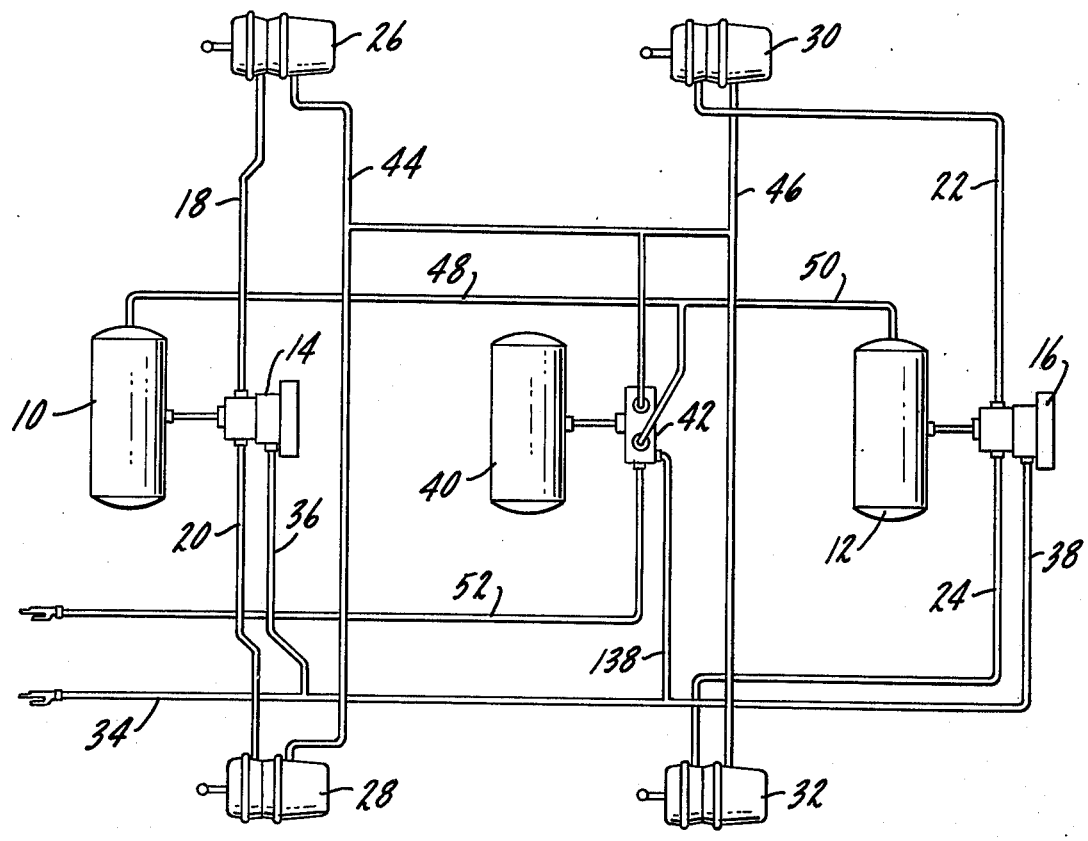
FIG. 1 is a diagrammatic illustration of a portion of a trailer air brake system.

In FIG. 1 service reservoirs or tanks 10 and 12 are connected to relay valves 14 and 16, respectively, with the relay valves being connected, through conduits 18, 20, 22 and 24, with the service ports of spring brake assemblies 26, 28, 30 and 32. A control signal for operating the relay valves will be provided on service line 34, which has connections 36 and 38 to the relay valves. All of the above structure and the operation thereof is well known in the art.

A spring brake reservoir or emergency tank is indicated at 40 and is connected to an air distribution valve 42. There are conduits 44 and 46 which connect air distribution valve 42 with the spring brake chambers of the brake assemblies 26-32. In the well-known manner, the emergency portions of each of the spring brake assemblies are spring operated and pressure released. There are conduits 48 and 50 which connect service tanks 10 and 12 with air distribution valve 42, and there is an emergency air conduit 52 which connects air distribution valve 42 to an emergency source through the conventional gladhand.

In previous air distribution systems there were separate check valves and pressure protection valves to control the supply of pressure from conduit 52 to the service reservoirs and to the emergency tank, as well as piston and shuttle combinations to control the supply of pressure to the spring brake chambers of each of the brake assemblies and to control the venting of pressure from these chambers. Not only does the present air distribution valve consolidate all such functions in a single reliably constructed and simply operable valve, but it has eliminated the ratio relay valve which was formerly a part of such a system.

Since tractor-trailer air brake systems conventionally have a tractor protection valve which will cut off the supply of air pressure to the trailer below a tractor supply pressure of approximately 30 psi, and since at a supply pressure of 30 psi, there was sufficient pressure from the emergency tank, ratio relay valve, to release the spring brakes, there is no need of modulating supply pressures over 30 psi, which was formerly the function of the ratio relay valve. Accordingly, such a valve element has been eliminated from the present valve and air brake system. There is no modulation of the supply from the emergency tank to the spring brake chambers. When the tractor protection valve opens, at a predetermined pressure, the spring brake chambers are placed in communication with the emergency tank.

Figure 2:
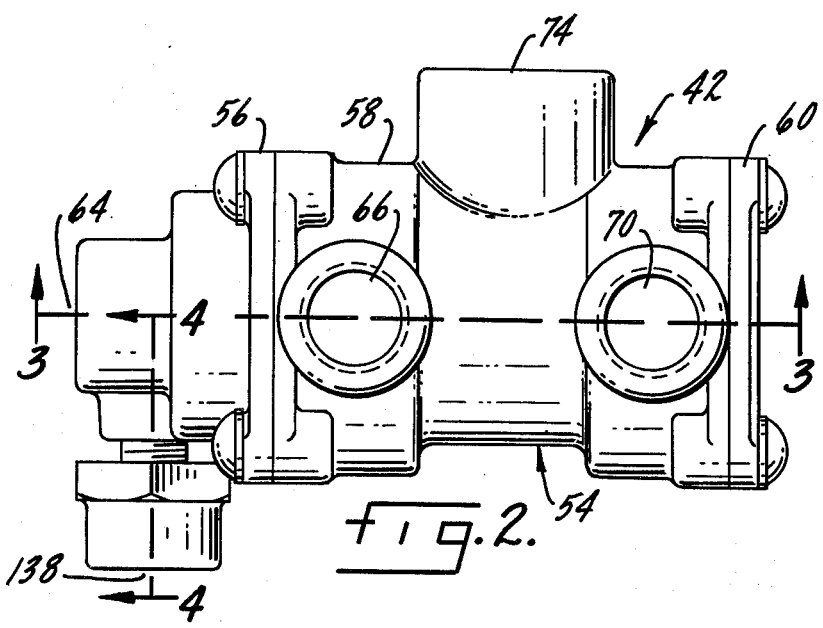
FIG. 2 is a plan view of the air distribution valve.

In FIG. 3, air distribution valve 42 has a housing, indicated generally at 54, which includes a front cap 56, a central body 58 and a rear cap 60. Housing 54 has a chamber 62 and an air inlet port 64, a pair of service tank ports 66 and 68, a pair of spring brake chamber ports 70 and 72, an emergency tank port 74 and an exhaust port 76, all of which open into central chamber 62. Positioned within chamber 62 and slidably movable therein is a shuttle 78, biased to the position shown in FIG. 2 by a coil spring 80 which is bottomed on housing 54.

Adjacent air inlet 64 is a conventional air filter 82. Looking specifically at the left-hand side of shuttle 78, the shuttle has a chamber 84 with openings 86 on opposite sides thereof which communicate with the exterior of the shuttle. Seal rings 88 and 90 are positioned on opposite sides of the termination of openings 86. A spring 92 is positioned within chamber 84 and urges a circular plate 94 against a seal member 96 which is carried by the shuttle. A nut 98 may be threaded into the open end of the shuttle and thereby fixes seal 96 to the shuttle. Seal 96 may include a steel washer 100 with the seal member being crimped about the washer and having seating surface 102 which faces plate 94. Plate 94 may have a plurality, for example four, outwardly extending arms, indicated at 104, which serve to position the plate for sliding movement within chamber 84, with the areas between the arms being available for the passage of air as it flows from the inlet, into chamber 84, when plate 94 has been moved against the biasing force of spring 92.

Immediately to the right of chamber 84 there is an annular space 106 formed in the exterior of the shuttle, with openings 108 connecting space 106 with a second chamber 110 similar to the chamber 84. A spring 112 is positioned within chamber 110 and urges a plate 114, substantially the same as plate 94, against a seal member 116, which again is the same as seal member 96. Chamber 110 may be defined by a bushing 118 which is threaded into the interior of the shuttle, as at 120. Openings 122 in bushing 118 are in alignment with openings 124 in the shuttle, whereby the interior of chamber 110 is in communication with the exterior of the shuttle. Seal rings 126 and 128 are positioned on opposite sides of openings 124, with seal rings 90 and 126 being positioned on opposite sides of space 106.

The shuttle is completed by a seal ring 130 which is particularly spaced from seal ring 128 as will appear hereinafter.

Exhaust port 76 may be closed by a conventional flapper valve 132 which will open and vent chamber 62 to atmosphere in response to interior air pressure.

Looking particularly at the bleed-down valve of FIG. 4, front housing cap 56 may have a bore 134 which, through an adapter 136, connects conduit 138 to control line 34 (FIG. 1). Under certain circumstances air pressure can be trapped within service line 34 coincident with operation of the spring brakes causing both service brakes and emergency brakes to be applied. The bleeddown valve will permit venting of pressure in the service line.

Adapter 136 includes a passage 140 which contains a spring 142 biasing a valve member 144 to the closing position of FIG. 4. Thus, pressure within service line 34, assuming no pressure applied to valve 42, will move valve member 144 away from its seat, against the action of spring 142, to pass such pressure into the inlet for air distribution valve 42 where it can be subsequently vented to atmosphere.

Brake assemblies 26–32 have both a service portion and an emergency portion. When the trailer is moving, the springs in the emergency portion are compressed. When the vehicle is parked the springs apply the parking or emergency brakes. To operate the brakes in the service portion a control air signal over line 34 will provide air pressure for braking, through relay valves 14 and 16, from service tanks 10 and 12.

Looking specifically at FIG. 3, when the emergency brakes or parking brakes are applied, valve 42 is in the position shown. Spring brake chamber ports 70 and 72 are in communication with exhaust port 76, thus no pressure is applied to the spring brake chambers. At such time as the pressure at inlet port 64 reaches approximately 30 psi, as controlled by the tractor protection valve, shuttle 78 will begin to move toward the right. Initial movement of the shuttle will place O-ring 130 to the right of ports 70 and 72 to close communication between the spring brake chambers an exhaust port 76. At approximately 35 psi inlet pressure the annular space between O-rings 128 and 130 will connect ports 70 and 72 and emergency tank port 74 to supply pressure from tank 40 to release the spring brakes.

As the shuttle is moving pressure at the inlet will move plate 94 away from valve seat 102, thus permitting inlet pressure to pass into chamber 84 and through openings 86 to the annular space about the exterior of the shuttle. At approximately 55 psi the shuttle will have moved a sufficient distance to the right such that openings 86 are in direct communication with service tank ports 66 and 68 and thus air pressure will be supplied to the service tanks. At this particular position of the shuttle, openings 86 will also be in communication with the annular space 106 about the exterior of the shuttle to the effect that the same air pressure supplied to the service tank ports will pass through openings 108 and move valve plate 114 away from its seat 116. Thus, air pressure will enter chamber 110, pass through aligned openings 122 and 124 to the exterior surface of the shuttle between O-rings 126 and 128. The air pressure at this point will then be supplied to the emergency tank port 74 and thus to the emergency tank 40, through the conduit arrangement illustrated in FIG. 1.

In the emergency cycle of the valve, when supply pressure decreases, the shuttle begins to move to the left. As supply pressure drops below approximately 55 psi, the shuttle will have moved a sufficient distance to cut off communication between inlet port 64 and service tank ports 66 and 68 and thus also the the emergency tank port 74. At approximately 35 psi, the shuttle will have moved a sufficient distance such that there will be no further communication between emergency tank port 74 and spring brake ports 70 and 72. At approximately 30 psi communication will be open between the spring brake chamber ports 70 and 72 and exhaust port 76 to thus vent the pressure from the brake chambers to atmosphere.

It should be understood that whereas specific pressures have been used to illustrate the operation of the valve, the invention obviously should not be limited to any particular pressures.

Whereas the preferred form of the invention has been shown and described herein, it should be realized that there may be many modifications, substitutions and alterations thereto.

The embodiments of the invention in which an exclusive property or privilege is claimed are defined as follows:

1. In a trailer air distribution valve, a housing, a chamber in said housing, said housing having an air inlet port, an exhaust port, at least one service tank port, an emergency tank port and at least one brake chamber port, all opening into said chamber, and a shuttle movable in said chamber to control air pressure flow between said ports,
    spring means biasing said shuttle to a position connecting said brake chamber port and exhaust port and closing communication between said inlet port and said service tank and emergency tank ports, air pressure at said inlet causing said shuttle to move to a position closing communication between said brake chamber port and exhaust port,
    passage means carried by said shuttle between said inlet port and said service tank port and spring biased valve means carried by said shuttle for closing said passage means between said inlet port and said service tank port,
    passage means for connecting said emergency tank port and inlet port and spring biased valve means for closing said passage means.

2. The structure of claim 1 further characterized in that said passage means between said inlet port and service tank port includes a chamber in said shuttle, openings in said shuttle connecting said chamber in said shuttle with the exterior surface thereof, a valve means spring being positioned within said chamber in said shuttle.

3. The structure of claim 2 further characterized by and including exterior seal members on said shuttle positioned on opposite sides of the openings connecting said chamber in said shuttle with the exterior of said shuttle.

4. The structure of claim 3 further characterized in that said valve means closing said passage means between said inlet port and service tank port includes a seal member carried by said shuttle and facing said chamber and a plate biased by said spring against said seal member.

5. The structure of claim 1 further characterized in that said passage means connecting said emergency tank port and inlet port is carried by said shuttle.

6. The structure of claim 5 further characterized in that said spring biased valve means for said passage means connecting said emergency tank port and inlet port is carried by said shuttle.

7. The structure of claim 1 further characterized by and including a pair of spaced seal members positioned about the exterior of said shuttle and movable into a position to control communication between said exhaust port and said brake chamber port.

8. In a trailer air distribution valve, a housing, a chamber in said housing, said housing having an air inlet port, an exhaust port, at least one service tank port, an emergency tank port and at least one brake chamber port, all opening into said chamber, and a shuttle movable in said chamber to control air pressure flow between said ports,
   spring means biasing said shuttle to a position connecting said brake chamber port and exhaust port and closing communication between said inlet port and said service tank and emergency tank ports, air pressure at said inlet causing said shuttle to move to a position closing communication between said brake chamber port and exhaust port,
   passage means between said inlet port and said service tank port and spring biased valve means for closing said passage means,
   passage means carried by said shuttle for connecting said emergency tank port and inlet port and spring biased valve means carried by said shuttle for closing said passage means connecting said emergency tank port and inlet port.

9. The structure of claim 8 further characterized by and including a chamber in said shuttle forming a portion of the passage means connecting said emergency tank port and inlet port, a spring positioned in said chamber associated with said passage means between said emergency tank and inlet ports for biasing said valve means between said emergency tank and inlet ports for closing said passage means connecting said emergency tank port and inlet port, and an opening connecting said chamber in said shuttle with the exterior of said shuttle.

10. The structure of claim 9 further characterized by and including seal means about the exterior of said shuttle on opposite sides of said opening.

11. The structure of claim 10 further characterized in that said valve means for closing said passage means connecting said emergency tank port and inlet port include a seal member fixed to said shuttle, and a plate positioned in said chamber in said shuttle and biased by said spring against said seal member.

12. The structure of claim 11 further characterized by and including openings in said shuttle communicating with the exterior thereof and with the side of said plate facing away from said chamber.

13. In a trailer air distribution valve, a housing, a chamber in said housing, said housing having an air inlet port, an exhaust port, at least one service tank port, an emergency tank port and at least one brake chamber port, all opening into said chamber, and a shuttle movable in said chamber to control air pressure flow between said ports,
   spring means biasing said shuttle to a position connecting said brake chamber port and exhaust port and closing communication between said inlet port and said service tank and emergency tank ports, air pressure at said inlet causing said shuttle to move to a position closing communication between said brake chamber port and exhaust port,
   passage means carried by said shuttle between said inlet port and said service tank port and spring biased valve means carried by said shuttle for closing said passage means between said inlet port and said service tank port, said passage means between said inlet port and service tank port including an opening terminating at the exterior of said shuttle, seal means positioned about the exterior of said shuttle and on opposite sides of said opening,
   passage means carried by said shuttle for connecting said emergency tank port and inlet port and spring-biased valve means carried by said shuttle for closing said passage means connecting said emergency tank port and inlet port, said passage means connecting said emergency tank port and inlet port including an opening terminating at the exterior of said shuttle, seal means positioned about the exterior of said shuttle and on opposite sides of said opening.

14. The structure of claim 13 further characterized in that each of said passage means includes a chamber, a spring positioned in each chamber, said openings connecting said chambers with the exterior of said shuttle.

15. The structure of claim 14 further characterized in that each of said spring biased valve means includes a seal member carried by said shuttle, a plate positioned within each chamber and biased by said springs against said seal members.

* * * * *